Jan. 31, 1967 J. GAON 3,302,006

MULTI-CATHODE ELECTRONIC STEPPING TUBE COUNTER AND INDICATOR

Filed Aug. 24, 1964

INVENTOR.
JOSEPH GAON

BY Howard J. Jeandron

AGENT

United States Patent Office 3,302,006
Patented Jan. 31, 1967

3,302,006

MULTI-CATHODE ELECTRONIC STEPPING TUBE COUNTER AND INDICATOR

Joseph Gaon, Bayside, N.Y., assignor to Heat Timer Corporation, New York, N.Y.

Filed Aug. 24, 1964, Ser. No. 391,585
4 Claims. (Cl. 235—92)

Figures 1, 2, 3:
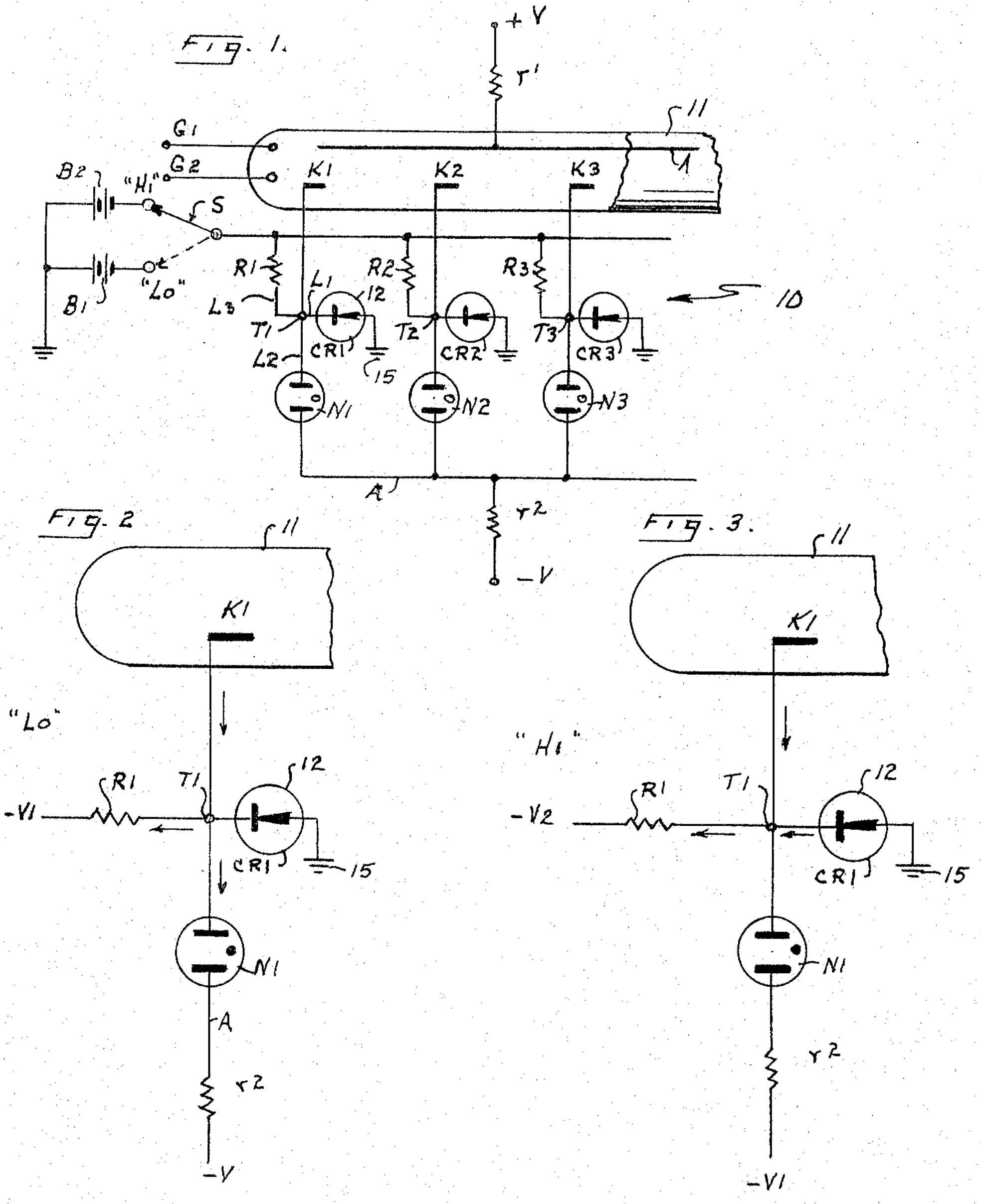

This invention relates to a circuit in combination with a pulse generator and a multi-cathode glow transfer stepping tube and more particularly to the means of counting the pulses provided and displaying the count while the counter continues to operate.

A multi-output pulse generator according to the invention may, for example, be used in a calculating machine for providing pulses which operate counting devices. In a decimal system the maximum number of pulses required from such a pulse generator will normally be nine or ten and, in this case, the glow transfer stepping tube may, for example, have ten cathodes. When the maximum number of pulses required in a cycle is nine, one cathode of a ten-cathode stepping tube may be used for transferring the timing pulse to the next electronic stepping tube.

Methods of driving multi-cathode glow transfer stepping tubes are well known, however although the electronic stepping tubes may accurately provide a count of the pulses provided by a pulse generator and thus be the actual counter, this count is so rapid that it is impossible to follow the count with the human eye, therefore the actual count must be stopped to make a reading when required or desired.

It is an object of this invention to provide a means of indicating the actual count of a multi-cathode glow transfer stepping tube at any time without stopping the counting device.

It is a further object of this invention to provide a means of indicating the actual count of a multi-cathode glow transfer stepping tube at any time without stopping the counting device and further to provide the means for the counter indicator to catch up to the continuing count immediately.

Further objects of this invention shall be apparent by reference to the accompanying detailed description and the drawings in which FIG. 1 is a schematic of an electronic counting circuit according to this invention, FIG. 2 is a schematic illustration of the count phase of the circuit illustrated in FIG. 1, and FIG. 3 is a schematic illustration of the store and display phase of the circuit illustrated in FIG. 1.

Referring to the drawings, there is illustrated schematically an electronic circuit 10 (FIG. 1) which includes a multi-cathode electronic stepping tube 11 also known as a gas filled glow transfer tube. The multi-cathode electronic stepping tube 11 is provided with ten cathodes K1 to K10 and an anode A. The anode is connected through a resistor $r^1$ to a potential of $x$ volts. The two drive electrodes G1 and G2 of the stepping tube 11 are connected through coupling circuits (not shown) to a pulse generator (not shown). The electronic circuit 10 also includes a diode 12 and a neon tube N1–N10 one for each cathode K1–K10 of the multi-cathode electronic stepping tube 11. The current input to each cathode K1–K10 when storing is through a resistor R1 for cathode K1, R2 for cathode K2 continuing to R10 for cathode K10 and when counting the current input for K1 is through N1, K2 through N2, etc. The potential input may be "Lo" voltage −V1 for counting and following but the potential input must be changed to "Hi" voltage −V2 for storing and displaying. The circuit 10, FIG. 1, therefore illustrates the stepping tube 11 with each cathode K1–K10 connected to a terminal T1–T10. Terminal T1 is also connected by lead L1 to one side of the diode 12, the opposite side being connected to ground 15. Terminal T1 is also connected by lead L2 to one side of the neon tube N1 the opposite side of the neon tube N1 being connected through a resistor $r^2$ to −Voltage (−V1). The controlling circuit L3 is also connected to terminals T1–T10 through biasing resistors R1–R10. The controlling circuit supplies either a "Lo" voltage −V1, (FIG. 2) for counting and following or a "Hi" voltage −V2 (FIG. 3) for storing and displaying the count. The choice of either voltage is by means of a two position switch S, in one position ("Lo") the voltage supplied by a battery B1 may be one volt and in the other position ("Hi") of switch S which is connected to a battery B2 the voltage may be 100 volts, each battery is in turn connected on the opposite side to ground. The glow transfer stepping tube of course will not be interrupted in its counting operation, that is, as long as the drive electrodes G1 and G2 are connected through their coupling circuit to the pulsing means, the tube continues to count as long as the cathode current and anode voltage continues to be supplied. However to indicate or display the count by means of the neon tubes N1–N10, the potential from battery B1 is supplied through switch S to terminal T. The magnitude of the current to the neon tube N1 must be such that the current through R1 and the current through the diode CR1 is a small fraction of the possible cathode current of the glow counter tube (for example, if the cathode K1 is provided nominally with 350 micro amps, then the current through R1 will be $V1/R1$, approximately 35 microamps.

In the count and follow state as illustrated in FIG. 2 when the glow discharge in the counter tube 11 settles on K1 the current demand of that cathode will be approximately 350 microamps, 35 of which will flow through R1 and the remaining 315 through N1 thus causing N1 to glow. While N1 is glowing the voltage between A and ground will be less than the maintaining voltage of N1. When the glow discharge is transferred to K2, the same current distribution provided for K1 will be provided for K2, therefore N2 will glow. The current through K1 drops to zero thus extinguishing N1.

In the store and display state as illustrated in FIG. 3 on a command to store initiated by the positioning of switch S in the "Hi" position, the count that will be indicated is the particular count then in progress indicated by K1, K2, K3, etc., and it is that count that will be indicated by the neon tube N1, N2, N3, etc., associated with the particular cathode the count has been picked up for display. As illustrated in FIG. 3 the current through R1+CR1, (R2+CR2), etc., must be greater than the glow counter cathode current (e.g., if cathode current is 350 microamps −V2/R1 should be approximately −700 microamps so that when the glow leaves K1, the current N1 is now supplied through R1 and current for all the subsequent cathodes whichever is on. The current through K2 will not go through the neon tube (N2) but will go through R2 as long as switch S remains in the "Hi" position. Therefore neon tube N2 does not glow and N1 remains glowing. As soon as the count indicated by the neon tube N1 has been taken switch S may be restored to the "Lo" position. Thus the cathode K2, K3, etc., presently receiving the input count will supply the cathode current 315 microamps as in FIG. 2 through the neon tube N2, N3, etc., thus causing N2, N3, etc., to glow indicating the count as it is proceeding.

Although we have illustrated an electronic means of counting the pulses provided in any circuit such as the pulses provided by a pulse generator and the means of displaying the count such as a neon tube while the pulses in the circuit continue to operate, the particular circuit illustrated and disclosed illustrates the combination with the pulse generator of a multi-cathode glow transfer stepping tube, a diode and a neon tube for each cathode of the multi-cathode glow transfer stepping tube, however, this invention shall not be limited by the combination of these components as long as electronic means are provided to change the voltage components required to control the displaying count indicator and this invention shall be limited only by the appended claims.

What is claimed is:

1. An electronic counting means to indicate the actual count at any time without stopping the counting device which includes a multi-cathode glow transfer tube as an electronic counter in combination with a circuit providing pulses to be counted, and a circuit connected to each cathode of said glow transfer tube counter, said circuit including a resistor to control current flow to each cathode, a diode to assist in controlling current flow to each cathode and a neon tube to store the current charge to indicate the count at any particular moment during the counting progress in said electronic counter, said circuit connected to a two position switch, one position of said switch connected to a high voltage supply for storing and displaying and the other position of said switch connected to a low voltage supply for counting and following.

2. An electronic counting means to indicate the actual count at any time without stopping the counting device which includes a multi-cathode glow transfer tube as an electronic stepping tube in combination with a pulse generator for counting and a circuit connected to each cathode of the multi-cathode electronic stepping tube, said circuit including a resistor to control current flow to each cathode, a diode to assist in controlling current flow to each cathode and a neon tube to store and indicate the position of the count progressing in said multi-cathode glow transfer stepping tube, each circuit connected to a two position switch and one position of said switch connected to a high voltage supply for counting and following and the other position of said switch connected to a low voltage supply.

3. A multi-cathode glow transfer stepping tube for counting the pulses from a pulse generator in which a circuit is connected to each cathode of said glow transfer tube from said pulse generator, said circuit including means to control the current flow and each cathode connected to a neon tube to store the count as it progresses, a switch to provide either a high or low voltage to said circuit, means to illuminate each neon tube to follow the count of the multi-cathode glow transfer stepping tube with a low voltage and means to stop the count in one neon tube and display the selected count on said neon tube with a high voltage while the multi-cathode glow transfer stepping tube continues to count the pulses from the pulse generator.

4. In a device according to claim 3 in which there is provided means to restore a low voltage to said circuit and resume following the count progressing in said multi-cathode glow transfer stepping tube.

References Cited by the Examiner

UNITED STATES PATENTS 2,922,576 1/1960 Winfield ------------ 235—92

OTHER REFERENCES

"New Applications for Beam Switching Tubes," by Bethke, from "Electronics," April 1956, pp. 122–126.

MAYNARD R. WILBUR, *Primary Examiner.*

J. F. MILLER, *Assistant Examiner.*